United States Patent
Jennings

[15] 3,687,199
[45] Aug. 29, 1972

[54] PROCESS FOR THE SECONDARY RECOVERY OF PETROLEUM

[72] Inventor: Robert R. Jennings, Walnut Creek, Calif.

[73] Assignee: The Dow Chemical Company, Midland, Mich.

[22] Filed: May 7, 1970

[21] Appl. No.: 35,486

[52] U.S. Cl. ................................166/274, 166/273
[51] Int. Cl. .............................................E21b 43/22
[58] Field of Search ...........166/273, 274, 305 R, 252

[56] References Cited

UNITED STATES PATENTS

| | | |
|---|---|---|
| 3,018,826 | 1/1962 | Sandiford..............166/273 X |
| 2,827,964 | 3/1958 | Sandiford..................166/274 |
| 3,039,529 | 6/1962 | McKennon................166/275 |
| 3,370,649 | 2/1968 | Wogemuth................166/274 |
| 3,406,754 | 10/1968 | Gogarty....................166/273 |
| 3,434,542 | 3/1969 | Dotson et al. .............166/273 |
| 3,467,187 | 9/1969 | Gogarty et al.............166/273 |

*Primary Examiner*—Stephen J. Novosad
*Attorney*—Griswold & Burdick, Herbert D. Knudsen and C. E. Rehberg

[57] ABSTRACT

Crude oil is recovered from a subterranean oil bearing formation by injecting an initial slug of an aqueous flooding medium containing a dissolved polymeric agent into the formation to displace the oil toward at least one output well communicating with the formation and then following the initial slug with a secondary aqueous slug having a dissolved polymer concentration of less than about one-third that of the initial slug but not in excess of 100 p.p.m.

7 Claims, 1 Drawing Figure

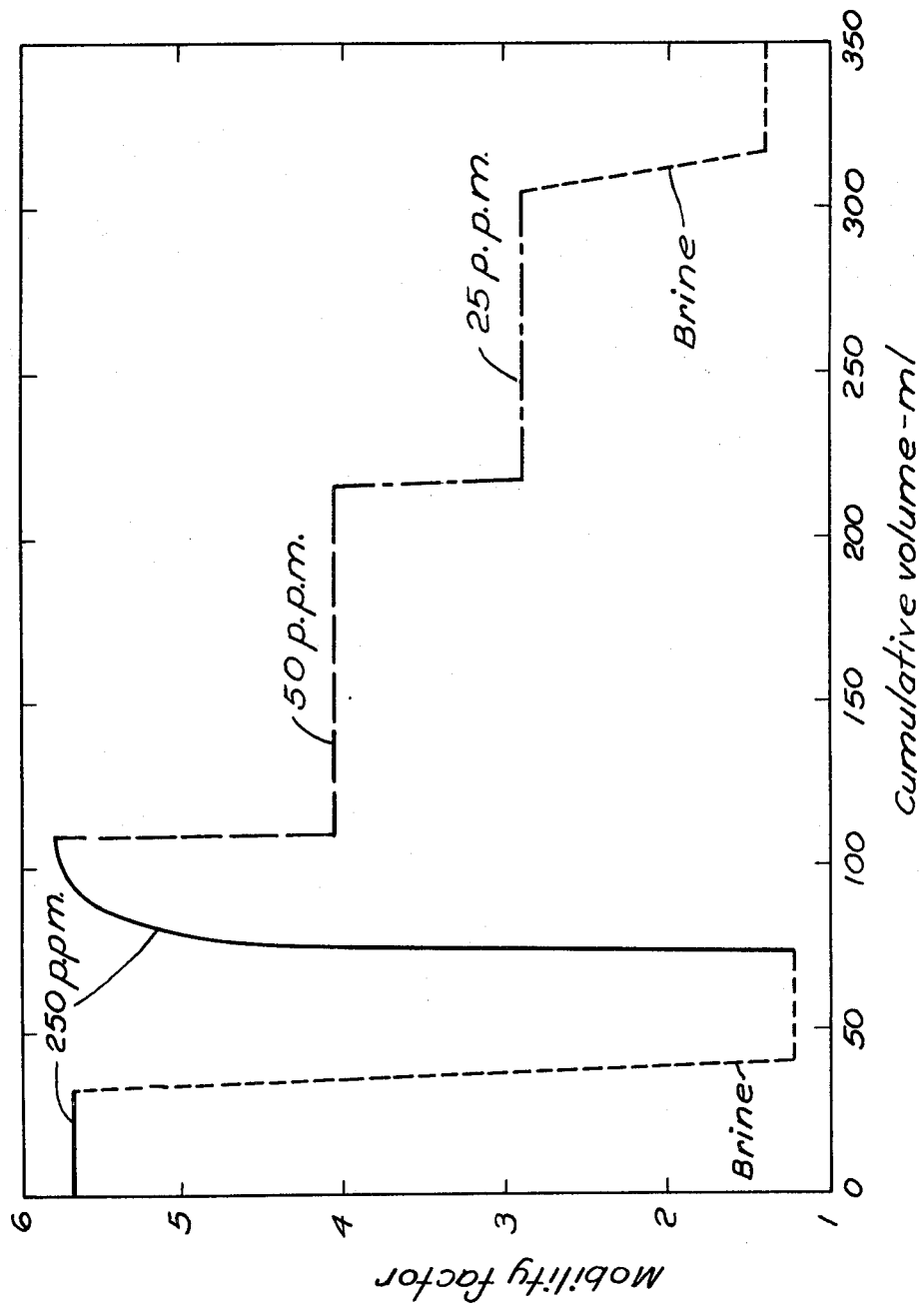

PROCESS FOR THE SECONDARY RECOVERY OF PETROLEUM

BACKGROUND OF THE INVENTION

The secondary recovery of oil is well known. In some secondary recovery methods water or brine solution is forced into an oil bearing formation to push the oil towards at least one output well. When only water or brine solution is employed without the addition of polymeric agents, the efficiency of the recovery is severely hampered in many cases because the flooding agents by-pass much of the oil that could be recovered. As a result of this and other deleterious aspects of using water or brine alone, polymeric agents have been incorporated into the pushing fluid to increase the viscosity of the fluid and decrease the mobility of the solution through the formation. As a result, the efficiency of the oil recovery has been increased. It has been proposed that fairly concentrated solutions of viscosity enhancing polymers be used as oil displacing fluids. These solutions may be technically efficient in the recovery of the oil but are economically unacceptable. Polymers especially suited for such applications are described by Pye in U. S. Pat. No. 3,282,337.

Gogarty in U.S. Pat. No. 3,406,754 teaches an attempt to make the secondary oil recovery more economically feasible by gradually increasing the mobility of the flooding medium from a low point at the oil interface to a high mobility of the primary drive material. To accomplish this, Gogarty uses an initial soluble oil slug, a water-external emulsion and then a thickened fluid drive material having a gradually increasing mobility to a mobility of essentially pure water.

SUMMARY OF THE INVENTION

In the process of the present invention, crude oil is recovered from a subterranean oil bearing formation by injecting into the formation an initial slug of an aqueous flooding medium containing a water-soluble, substantially linear organic polymer characterized by a resistance property, hereinafter defined, of at least 1.5, and then injecting a secondary aqueous slug having a dissolved polymer concentration up to about one-third that of the initial slug but not in excess of 100 p.p.m. By the use of this technique, the beneficial effect of the initial relatively concentrated slug is economically retained.

The essential and novel feature of the invention involves following the principal polymer bank in a secondary oil recovery process with a solution of the polymer which is much more dilute than that of the principal polymer bank while maintaining at least some dissolved polymer in the flooding medium. The surprising feature of the invention is the high retention of the reduced mobility characteristic indicative of the principal bank even when the polymer concentration is substantially less than a third the concentration of the initial bank. Not only is the efficiency retained, but the use of smaller quantities of polymer lowers the effective cost of secondary oil recovery.

The FIGURE shows a representative plot of the mobility factor of polymer solution in a typical oil field core for varying concentrations of polymer put through the same core as will be set forth in detail hereinafter.

The displacement of oil in secondary oil recovery is affected by a substantial number of variables, not all of which are known. Some of the known variables, however, include: those relating to the oil bearing formation, such as the heterogeneity of the formation, the geometrical arrangement of the injection and the withdrawal points, the permeability of the formation and the mobility of the oil; and those relating to the flooding medium, such as the nature and viscosity of the flooding solutions and the mobility of the solution in the formation.

The most important combination of these variables is the mobility of the oil in the formation compared to the mobility of the flooding solution. If the mobility of the oil is low and the mobility of the flooding solution is relatively high, the efficiency of the oil displacement is quite low because the higher mobility of the flood causes the solution injected to pass by some of the less mobile oil and eventually "finger through" to the production well.

This same phenomenon exemplifies the possible problems associated with the injection of two polymer banks where the second bank has a substantially lower polymer concentration. It would be expected that the subsequent dilute bank would tend to finger through the preceding bank and the less mobile oil to decrease the efficiency of the recovery.

It would also be projected that the problem of fingering through would be accentuated by subterranean formations of heterogeneous permeability. Indeed, this is the major drawback of aqueous flooding. In such secondary oil recovery water fingers through the zones of high permeability and blocks recovery of oil from those zones of lower permeability. Technically, this problem has been solved by the addition of relatively high polymer concentrations which substantially decrease the mobility of the slug through the zones of high permeability in an attempt to equate the mobility of the fluid through the sectors of the heterogeneous formation. Sustained use of such concentrations, however, is economically unacceptable.

Surprisingly, it has now been found that fingering by a significantly less concentrated polymer solution is minimal or nonexistent, and the beneficial effect of relatively high polymer concentrations is substantially retained during flooding with subsequent dilute banks even in formations of heterogeneous permeability.

The important quantative measurement of the comparative mobilities in the invention is the "mobility factor." This mobility factor is expressed as the resistance to flow of the solution tested (usually the polymer solution) relative to the resistance to passage of the brine or aqueous solution through a sample of the formation having residual oil saturation before any treatment with polymer. This mobility factor is defined as:

$$M.F. = \left(\frac{Q}{\Delta P}\right)_B \div \left(\frac{Q}{\Delta P}\right)_S = \left(\frac{K}{\mu}\right)_B \div \left(\frac{K}{\mu}\right)_S = M_B M_S$$

where
- $Q$ = flow rate
- $\Delta P$ = pressure drop
- $K$ = effective permeability
- $\mu$ = solution viscosity
- $M = K/\mu$ = mobility
- $S$ = solution tested, usually the polymer solution
- $B$ = water or brine A mobility factor of 3 simply indicates that the solution tested is three times as hard to push through the sample as the water or brine. The comparative mobility factors of various polymer solutions on the sample core can be correlated to the recovery of oil from the formation.

In a practical application, the interreaction between the proposed reservoir formation, the oil, the brine or water to be used as the flooding medium, the nature of the polymer, the concentration at which the polymer is initially employed, the concentration of any subsequent polymer-containing brines and the various other factors involved in secondary oil recovery are so complex that a prediction of the effects cannot be accurately made without some prior approximation. By using cores from the formation and evaluating the comparative mobility factors, the proper application of the invention may be conveniently obtained. Although this information may be applied to approximate the actual conditions of the secondary oil recovery, the experimental analogy cannot be completely accurate. The inaccuracies, however, result mainly from the unavailability of samples which are indicative of the total formation.

The invention may be applied to a specific formation by simply following the steps outlined below:

a. Representative samples of the formation and fluids involved are obtained;

b. Small right cylinders of the formation measuring 1 inch in diameter by 1 inch high are prepared and placed in a test apparatus designed to flow liquids through the specimen measuring the pressures and flows; if the formation is not mechanically strong enough to support a cylinder, special techniques may be used in preparing the test specimen;

c. The sample is flooded with brine from the formation and then with oil, preferably the oil of the reservoir. This oil is then displaced as completely as possible by water or brine equivalent to that proposed for the injection to give a sample having residual oil saturation. At all stages, the pressures and flow rates are monitored to permit the calculation of the mobility factors of the different fluids in the specimen;

d. A relatively concentrated solution of a polymer having a resistance property of 1.5 in the proposed injection water is passed through the core. The polymer flooding solutions are those usually employed in conventional applications; for example, a concentration of partially hydrolyzed polyacrylamide between 200 and 1,000 p.p.m. would be typical. The mobility of this solution is compared to that of the injection water run through the specimen before the injection of polymer to give the mobility factor of the concentrated slug;

e. To determine whether the invention is applicable to the formation, a polymer-free injection fluid is then introduced in quantities sufficient to reach a stable flow condition as indicated by the invariance of the pressure and flow rate as several pore volumes of fluid are passed through the core. After steady state conditions have been attained, the mobility factor associated with the polymer-free solution is compared to that of the initial polymer bank. If the polymer-free solution shows a mobility factor at equilibrium substantially below that of the initial polymer bank, a secondary bank with a reduced polymer concentration would be considered to be of possible benefit;

f. The initial relatively concentrated polymer solution is again introduced into the specimen until stable conditions exist. This reintroduction of the initial polymer bank is required because the benefits of a lower concentration of polymer in the aqueous solution can only be realized if the less concentrated solution is introduced immediately after the concentrated slug;

g. Solutions containing lower concentrations of the polymer should then be tested until the levels are not capable of sustaining a sufficiently high mobility factor to be of interest. Economics will usually require that this concentration of the subsequent polymer flow be less than one-third that of the initial polymer bank, with concentrations of one-fourth to one-tenth generally being preferred. Of course, most economical would be the lowest concentration that would give satisfactory retention of the desirable mobility factor; and h. After the examination has given the desired results, the core may be flushed with water or brine to equilibrium and a different concentration of the initial polymer bank may be tested with subsequent evaluations of the effectiveness of lower polymer concentrations. Also, other polymers may be tested to determine their effectiveness in the invention.

The test procedures as outlined above provide an effective and convenient method of determining the concentration of the initial slug and the concentration of subsequent slugs in secondary oil recovery. Since the formation may be substantially heterogeneous, it is desirable to make a number of tests on various cores of the formation to give experiments which can be readily correlated to the actual situation. With representative examples, the procedures outlined provide a good analogy of the actual oil recovery from a formation by secondary techniques.

The polymers employed in the aqueous solutions can be any of the water-soluble organic polymers or mixture thereof which are sometimes referred to as hydrophilic polymeric colloids. These polymers are generally characterized by substantial linearity and high molecular weight. As noted above, these polymers must have a resistance property of at least 1.5. Such resistance property is defined by Pye in U.S. Pat. No. 3,282,377 according to the formula:

$$\text{Resistance Property} = R = \frac{27}{(Q_p \eta_p)} - 1$$

In the formula $\eta_p$ is the viscosity of 0.05 percent by weight solution of the water-soluble polymer in a 3 percent by weight aqueous sodium chloride solution, such viscosity being measured with an Ostwald viscosimeter, i.e., determined by means of measuring flow rates through a capillary at 25° C. $Q_p$ is the flow rate in milliliters per minute, under a given pressure, of a 0.05 percent by weight solution of the polymer in a 3 percent by weight aqueous sodium chloride solution, lengthwise through a right cylindrical core of Berea sandstone, one inch in diameter and one inch long, the core having been previously saturated with the 3 percent sodium chloride solution. The sandstone core used in this measurement has, when dry, a permeability to air within the range of 100 to 500 millidarcys. The pressure at which the flow rate is measured is that pressure required to flow a solution of 3 percent by weight sodium chloride in water through the sandstone core at a rate of 30 milliliters per minute.

These polymers are dispersible in water to provide a visually homogeneous system during flooding operations. Various water-soluble polymers that are suitable for the present invention are described by Pye, with polymers having ionizable groups such as sulfate, sulfonate, carboxylate, carboxamide, amino and ammonium groups being operable. Especially pertinent high molecular weight polymers are obtained by addition or condensation polymerization of the appropriate monomers. The preparation of these polymers is found among the addition polymers obtained by ethylenic polymerization such as those described in Hedrick et al. in U.S. Pat. No. 2,625,529; Aimone et al. in U. S. Pat. No. 2,740,522; and Booth et al. in U. S. Pat. No. 2,729,557. A variety of polysaccharide derivatives are described in Gloor in U. S. Pat. No. 2,728,725. Polyurethanes or chain extended polyols will be found in Honea et al. in U. S. Pat. No. 3,054,778 and a number of polycarbamates and lactams are found in Hibbard et al. in U. S. Pat. No. 3,044,992; Wales et al. in U. S. Pat. No. 2,946,772; Vitales in U. S. Pat. No. 2,874,124; and Fong et al. in U. S. Pat. No. 3,000,830. Further polymers may be prepared as shown by Davidson and Sittig in "Water-Soluble Resins," Reinhold Publishing Company, New York, 1962. Polyacrylamides and particularly polyacrylamides having from about 15 to 30 percent of their carboxamide groups hydrolyzed to carboxyls are the polymers of special interest in the present invention.

The amount of the initial polymer bank introduced into the formation may vary widely. Since the polymers and formations differ substantially from application to application, the amount of the initial polymer bank cannot be precisely defined. The amount, however, may be approximated by reference to the preliminary mobility testing as described above using the core samples and also from a study of core logs and other tests of the formation under consideration. These tests will generally give an indication of how much of the initial relatively concentrated polymer solution need be passed into the formation to give the necessary base for the addition of dilute polymer solutions. In practice it is generally found that adequate mobility control is accomplished with an initial slug constituting from about 10 to about 50 percent, preferably from about 20 to about 30 percent, of the pore volume of the formation being treated. In any case, such initial slug will be designed to be sufficient to assure that the subsequent dilute polymer solutions will retain the desired mobility factor.

The concentration of the water-soluble polymer in the aqueous flooding medium of the initial bank may also vary widely again depending upon the polymer employed, the oil displaced and the particular formation. The resultant polymer solution usually has a viscosity of at least one-half of 1 percent of the crude oil, with polymer solutions having a viscosity of at least 5 percent that of the crude oil being preferred. The highest concentration is limited only by practical considerations of workability and economy.

The secondary bank of polymer solution or dilute polymer solution has a concentration of up to about one-third that of the initial polymer bank but not in excess of 100 p.p.m. Although different polymers could be added to the secondary bank of the flooding, use of the same polymer in both slugs is much preferred. Thus, any of the polymers or mixtures thereof that may be used in the initial relatively concentrated bank can be used in the secondary bank although they are present in a lower concentration. The concentration of the secondary solution must be less than one-third of the concentration of the original bank, or if different polymers are employed, the concentration should produce a similar mobility factor as a secondary bank of the same polymer. Solutions of the secondary polymer having one-fourth to one-tenth the concentration of the initial polymer bank and a mobility factor at least twice that of the subsequent flood with water or brine after polymer treatment are preferred. Also preferred is a subsequent slug having a polymer concentration of at least about 10 p.p.m.

The optimum concentrations which give the highest mobility factor with the least amount of polymer may be determined or at least approximated from the core models. In such determination, the initial slug of concentrated polymer solution is followed by a dilute secondary slug in the same proportions and concentrations proposed for the oil recovery operation. The slugs which gave the highest sustained mobility factor with the least amount of polymer is the optimum solution if the formation conforms to the core sample.

From the discussion above, it can be readily seen that different techniques may be employed to accomplish the same results of the invention. For example, the polymer concentration may be abruptly reduced more than once. Also covered by the present invention is the rapid gradient concentration reduction of the polymer solution as opposed to the gradual reduction in the concentration of polymer solution shown in the art.

SPECIFIC EMBODIMENTS

EXAMPLE 1

A Berea sandstone specimen in the form of a 1 inch diameter by 1 inch high right cylinder having an air permeability of 250 millidarcies was placed in a test apparatus which consisted of a hollow cylinder which fit tightly around the specimen to prevent the flowing of any liquid between the wall of the hollow cylinder and the specimen but at the same time providing an excess hollow space below and above the test specimen. The sample had a pore volume of 2.25 ml. The specimen was flooded with a brine containing 4 percent sodium chloride and 0.3 percent calcium chloride dihydrate. The specimen was then saturated with a refined oil having a viscosity of 6.5 cps., and the oil was displaced with a large volume of brine. This sequence of fluids resulted in the establishment of an irreducible saturation of oil in the porous spaces of the rock. The flow rate of the brine was then determined at a measured pressure.

Solutions of a partially hydrolyzed, substantially linear, high molecular weight polyacrylamide sold under the trade name Pusher P700 were prepared. The initial concentrated bank was a 250 p.p.m. solution having a viscosity of 1.35 cps. The treatment of the sample with this initial slug and subsequent slugs having a lower concentration are shown in the FIGURE.

It will be noted that a 5 fold reduction in the concentration, over 70 percent of the original mobility factor was retained and at a 10 fold dilution, the mobility factor was about 50% that of the original concentrated slug.

EXAMPLE 2

After completion of primary oil production from a formation of which the core of Example 1 constitutes a representative sample, the oil field in integrated under unitary management and secondary recovery is instituted by pumping brine, having substantially the same composition as the connate water in the formation, into a plurality of selected injection wells penetrating said formation and producing fluids from a plurality of production wells properly spaced from the injection wells and likewise penetrating the formation. Shortly after initiation of secondary recovery, it is found by the use of tracers that injected brine is appearing in production well fluids and when the ratio of water to oil in the produced fluids rises to 3 to 1, it is decided to initiate polymer flooding. After providing suitable tanks, pumps and injection valves, a solution is prepared containing 0.5 percent by weight of hydrolyzed polyacrylamide in the brine, the polyacrylamide being substantially linear and of high molecular weight, being characterized by a viscosity of about 25 centipoises for a 0.4 percent by weight solution thereof in 4 percent sodium chloride brine at a temperature of 25° C., and having about 20 percent of its carboxamide groups hydrolyzed to carboxylate groups in the sodium salt form. The resulting solution is introduced through a proportioning pump into the main brine supply flowing to the injection wells in amount sufficient to provide 300 parts by weight of the polymer per million parts of medium injected into the oil-bearing formation. Injection of polymer solution is continued until a volume corresponding to 25 percent of the pore volume of the formation has been injected. During this period, the injection well pressures increase and the water-cut of the fluids in the production wells is stabilized. The polymer dosage is thereupon decreased to provide a flooding medium containing 25 parts of polymer per million parts of medium and flooding with this latter medium is continued. It is found that injection pressures are maintained at a desirable high level without evidence of premature break-through of the flooding medium.

In the same manner as shown by the examples above, the techniques applied to the core samples may be applied to secondary oil recovery by introducing into an oil bearing formation the hydrolyzed polyacrylamide or other water-soluble, high molecular weight polymer in a water flood at an initial relatively high concentration and then substantially reducing the concentration with a subsequent flood while retaining a high proportion of mobility control properties to improve the efficiency of oil displacement.

I claim:

1. In the process for the secondary recovery of oil from a subterranean formation by injecting into an oil bearing formation an aqueous flooding medium containing a dissolved polymeric agent to displace the oil toward one or more output wells communicating with the formation, the improvement comprising injecting into the formation an initial aqueous slug having a dissolved polymeric agent with a resistance property of at least about 1.5, and then injecting a secondary slug having a dissolved polymer concentration of up to about one-third that of the initial slug but between about 10 and 100 p.p.m. for the use of the same polymer or for the use of another polymer, a solution that produces a similar mobility factor as a secondary slug of the same polymer.

2. The process of claim 1 wherein the secondary slug contains the same polymer as the first slug.

3. The process of claim 1 wherein the viscosity of the initial slug is greater than about one-half of 1 percent of the viscosity of the oil to be displaced.

4. The process of claim 1 wherein the concentration of the secondary slug is one-fourth to one-tenth that of the initial slug.

5. The process of claim 1 wherein the mobility factor of the secondary polymer bank is at least twice the mobility factor of the brine or water after polymer treatment.

6. The process of claim 1 wherein the dissolved polymer is a polyacrylamide.

7. The process of claim 6 wherein the polyacrylamide is partially hydrolyzed.

* * * * *